US011793112B2

(12) United States Patent
Hunt

(10) Patent No.: US 11,793,112 B2
(45) Date of Patent: Oct. 24, 2023

(54) SYSTEM AND METHOD FOR SENSING HARVESTED CROP LEVELS UTILIZING A STOWABLE SENSOR ARRAY

(71) Applicant: CNH Industrial America LLC, New Holland, PA (US)

(72) Inventor: Cory Douglas Hunt, Millersville, PA (US)

(73) Assignee: CNH Industrial America LLC, New Holland, PA (US)

(*) Notice: Subject to any disclaimer, the term of this patent is extended or adjusted under 35 U.S.C. 154(b) by 945 days.

(21) Appl. No.: 16/660,973

(22) Filed: Oct. 23, 2019

(65) Prior Publication Data

US 2021/0120742 A1 Apr. 29, 2021

(51) Int. Cl.
*A01D 41/127* (2006.01)
*G01F 23/80* (2022.01)
*A01D 41/12* (2006.01)
*A01D 75/00* (2006.01)

(52) U.S. Cl.
CPC ..... *A01D 41/1275* (2013.01); *A01D 41/1217* (2013.01); *A01D 41/1226* (2013.01); *G01F 23/804* (2022.01); *A01D 75/00* (2013.01)

(58) Field of Classification Search
CPC ............ A01D 41/1275; A01D 41/1208; A01D 41/1217; A01D 41/1226; A01D 41/1271; G01F 23/804
See application file for complete search history.

(56) References Cited

U.S. PATENT DOCUMENTS 5,529,537 A * 6/1996 Johnson ............. A01D 41/1275
460/150
6,366,210 B2 * 4/2002 Lemke ................. A01D 46/082
460/115

(Continued)

FOREIGN PATENT DOCUMENTS

DE 102020204860 A1 * 10/2020 ............. A01D 41/12
EP 1714542 A1 10/2006

(Continued)

OTHER PUBLICATIONS

Extended European Search Report for EP Application No. 20202778.5 dated Feb. 23, 2021 (six pages).

*Primary Examiner* — Thomas B Will
*Assistant Examiner* — Joan D Misa
(74) *Attorney, Agent, or Firm* — Peter Zacharias

(57) ABSTRACT

A system for sensing harvested crop levels within a crop tank of an agricultural harvester includes a tank cover section movable between an open position and a covered position relative to an opening of the crop tank. The system includes a sensor array including crop level sensors configured to capture data indicative of a crop level of harvested crop. The sensor array is supported, at least in part, relative to the crop tank such that the sensor array is configured to have a first orientation when the tank cover section is in the covered position and a second orientation when the tank cover section is in the open position. The sensor array defines a first vertical dimension when the sensor array is disposed in the first orientation that is less than a second vertical dimension defined by the sensor array when the sensor array is disposed in the second orientation.

12 Claims, 8 Drawing Sheets

(56) References Cited

U.S. PATENT DOCUMENTS

| | | | |
|---|---|---|---|
| 6,508,705 B1 * | 1/2003 | Van Overschelde | A01D 41/1226 460/119 |
| 7,585,214 B1 | 9/2009 | Johnson et al. | |
| 8,981,949 B2 | 3/2015 | Ricketts et al. | |
| 9,085,381 B2 * | 7/2015 | Gengerke | G01F 23/2921 |
| 9,119,342 B2 | 9/2015 | Bonefas | |
| 9,949,435 B2 * | 4/2018 | Banks, Jr. | A01D 41/1208 |
| 10,231,381 B2 * | 3/2019 | Holt, II | A01D 41/1208 |
| 10,368,488 B2 * | 8/2019 | Becker | A01D 41/1275 |
| 2006/0240884 A1 | 10/2006 | Klimmer | |
| 2012/0200697 A1 * | 8/2012 | Wuestefeld | H04N 7/18 198/810.01 |

FOREIGN PATENT DOCUMENTS

| | | |
|---|---|---|
| EP | 2944178 A1 | 11/2015 |
| RU | 2483527 C2 | 6/2013 |
| WO | 2014030511 A1 | 2/2014 |
| WO | WO 2015052563 A1 | 4/2015 |
| WO | 2017187249 A1 | 11/2017 |
| WO | 2017187250 A1 | 11/2017 |
| WO | WO 2017187250 A1 | 11/2017 |

* cited by examiner

FIG. 4

SYSTEM AND METHOD FOR SENSING HARVESTED CROP LEVELS UTILIZING A STOWABLE SENSOR ARRAY

FIELD

The present disclosure generally relates to agricultural harvesters and, more particularly, to systems and methods for sensing levels of harvested crop stored within a crop tank of an agricultural harvester utilizing a sensor array actuatable between an operational position and a stowed position.

BACKGROUND

A harvester is an agricultural machine that is used to harvest and process crops. For instance, a forage harvester may be used to cut and comminute silage crops, such as grass and corn. Similarly, a combine harvester may be used to harvest grain crops, such as wheat, oats, rye, barely, corn, soybeans, and flax or linseed. In general, the objective is to complete several processes, which traditionally were distinct, in one pass of the machine over a particular part of the field. In this regard, most harvesters are equipped with a detachable harvesting implement, such as a header, which cuts and collects the crop from the field and feeds it to the base harvester for further processing. After processing, the harvested crop may be delivered to a crop tank of the harvester for storage.

Some crop tanks are equipped with movable crop tank covers that move relative to the crop tank and can expand the capacity of the crop tank, in addition to covering the crop tank when the harvester is not operating. Crop tanks can also include a bubble-up auger, which redistributes the grain within the crop tank to allow for a more even level of grain within the crop tank. The bubble-up auger can be mounted or otherwise linked to one of the crop tank covers so that, as the crop tank cover raises and descends, the bubble-up auger also raises and descends.

Many harvesters include a sensor configured to sense harvested crop levels within the crop tank. For example, the sensor may be oriented to sense the top surface of the harvested crop and monitor, such as with an associated controller, the crop levels within the crop tank and thus the fill-level of the crop tank. However, integrating crop level sensors within crop tanks that include movable crop tank covers presents numerous challenges. For instance, it may be difficult to place the sensor at a suitable location to sense the crop level within the crop tank while also preventing the sensor and associated components from interfering with the movement of other components of the crop tank, such as the crop tank covers and bubble-up auger. Further, a sensor placed at a location such that the sensor does not interfere with the motion of the tank covers and bubble-up auger may not be able to accurately measure the crop level in all circumstances, such as when the crop level increases to utilize the expanded capacity allowed by the crop tank covers.

Accordingly, an improved system and method for sensing harvested crop levels within an agricultural harvester would be welcomed in the technology.

BRIEF DESCRIPTION

Aspects and advantages of the technology will be set forth in part in the following description, or may be obvious from the description, or may be learned through practice of the technology.

In one aspect, the present subject matter is directed to a system for sensing harvested crop levels within an agricultural harvester. The system includes a crop tank extending in a vertical direction between a top end and a bottom end of the crop tank. The crop tank includes a frame having an opening formed therethrough and a tank cover section provided in operative association with the frame such that the tank cover section is movable between an open position and a covered position relative to the opening of the frame. Further, the crop tank is configured to receive harvested crop. The system also includes a sensor array including a plurality of crop level sensors spaced apart from one another between a first end of the sensor array and a second end of the sensor array. Each crop level sensor of the plurality of crop level sensors is configured to capture data indicative of a crop level of the harvested crop received within the crop tank. The sensor array is supported, at least in part, relative to the crop tank such that the sensor array is configured to have a first orientation when the tank cover section is in the covered position and a second orientation when the tank cover section is in the open position. Moreover, when the sensor array is disposed in the first orientation, the sensor array defines a first vertical dimension in the vertical direction between the first and second ends of the sensor array that is less than a second vertical dimension defined by the sensor array in the vertical direction between the first and second ends of the sensor array when the sensor array is disposed in the second orientation.

In a further aspect, the present subject matter is directed to a method for sensing a current crop level within a crop tank of an agricultural harvester. The crop tank extends in a vertical direction between a top end and a bottom end of the crop tank. The method includes repositioning a movable component of the crop tank from a first position to a second position. Additionally, the movable component is coupled to a sensor array including a plurality of crop level sensors spaced apart from one another between opposed first and second ends of the sensor array. The method further includes pivoting the sensor array from a first orientation to a second orientation as the movable component is being repositioned from the first position to the second position such that a vertical dimension of the sensor array defined in the vertical direction between the first and second ends of the sensor array increases. The method also includes capturing, with the sensor array, data indicative of a crop level of the harvested crop within the crop tank.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which:

FIG. 4 illustrates another, schematic, side view of the crop tank of FIG. 3 in accordance with aspects of the present subject matter, particularly illustrating tank cover sections of the crop tank in an open position;

Figure 1:
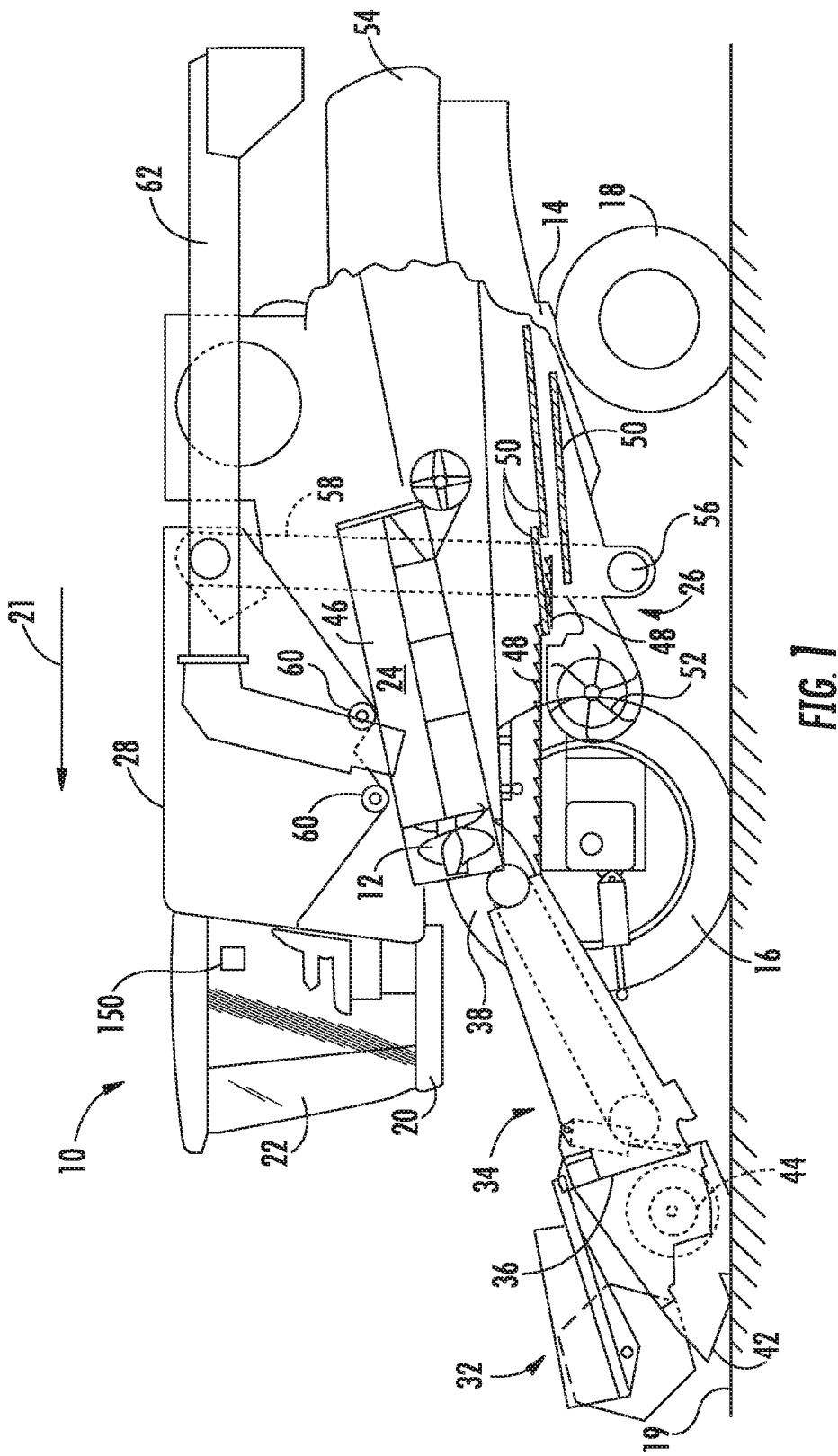
FIG. 1 illustrates a partial, sectional, side view of one embodiment of an agricultural harvester in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and associated methods for sensing harvested crop levels within an agricultural harvester. Specifically, in several embodiments, the system may include a crop tank of the agricultural harvester that is configured to receive harvested crops. The crop tank may include one or more tank cover sections movable between an open position and a covered position relative to an opening of the crop tank. Optionally, the crop tank may include one or more additional components movable between stowed and deployed positions correlating with the covered and open positions of the tank cover section(s), such as a bubble-up auger or an expandable element. The system further includes a sensor array having crop level sensors configured to capture data indicative of a crop level of harvested crop received by the crop tank. The sensor array is supported, at least in part, relative to one of the tank cover sections or another movable component of the crop tank that moves with the tank cover sections such that the sensor array is configured to have a first orientation when the tank cover section(s) is in the covered position and a second orientation when the tank cover section(s) is in the open position. In such an embodiment, the sensor array may be stowed while in the first orientation such that the sensor array takes up less vertical space within the crop tank. As needed, the sensor array may pivoted to the second orientation in order to capture data indicative of the crop level within the crop tank.

Furthermore, such a system may allow for the sensor array to take up less room within the crop tank when the tank cover section(s) are in the covered position. Moreover, by stowing the sensor array, the sensor array may be positioned to not interfere with the movement of the tank cover section(s) and/or other movable components of the crop tank. By coupling the sensor array to the tank cover section(s) or another movable component of the crop tank that moves with the tank cover section(s), the sensor array may automatically be deployed as the tank cover sections are opened. Additionally, such a configuration may allow for the sensor array to be oriented and placed in an appropriate or desirable location to capture data indicative of the harvested crop levels within the crop chamber when in the second orientation and then stowed away in a more convenient, stowed location automatically as the tank cover section(s) is closed.

Referring now to the drawings, FIG. 1 illustrates a simplified, partial sectional side view of one embodiment of an agricultural harvester 10. As shown, the harvester 10 may be configured as an axial-flow type combine, wherein crop material is threshed and separated while it is advanced by and along a longitudinally arranged rotor 12. The harvester 10 may include a chassis or main frame 14 having a pair of driven, ground-engaging front wheels 16 and a pair of steerable rear wheels 18. The wheels 16, 18 may be configured to support the harvester 10 relative to a ground surface 19 and move the harvester 10 in a forward direction of travel 21 relative to the ground surface 19. Additionally, an operator's platform 20 with an operator's cab 22, a threshing and separating assembly 24, a grain cleaning assembly 26, and a crop tank 28 may be supported by the frame 14. Furthermore, as is generally understood, the harvester 10 may include an engine and a transmission mounted on the frame 14. The transmission may be operably coupled to the engine and may provide variably adjusted gear ratios for transferring engine power to the wheels 16, 18 via a drive axle assembly (or via axles if multiple drive axles are employed).

Moreover, as shown in FIG. 1, a harvesting implement (e.g., a header 32) and an associated feeder 34 may extend forward of the main frame 14 and may be pivotally secured thereto for generally vertical movement. In general, the feeder 34 may be configured to serve as support structure for the header 32. As shown in FIG. 1, the feeder 34 may extend between a front end 36 coupled to the header 32 and a rear end 38 positioned adjacent to the threshing and separating assembly 24. As is generally understood, the rear end 38 of the feeder 34 may be pivotally coupled to a portion of the harvester 10 to allow the front end 36 of the feeder 34 and, thus, the header 32 to be moved upwardly and downwardly relative to the ground 19 to set the desired harvesting or cutting height for the header 32.

As the harvester 10 is propelled forwardly over a field with standing crop, the crop material is severed from the stubble by a sickle bar 42 at the front of the header 32 and delivered by a header auger 44 to the front end 36 of the feeder 34, which supplies the harvested crop to the threshing and separating assembly 24. As is generally understood, the threshing and separating assembly 24 may include a cylindrical chamber 46 in which the rotor 12 is rotated to thresh and separate the harvested crop received therein. That is, the harvested crop is rubbed and beaten between the rotor 12 and the inner surfaces of the chamber 46, whereby the grain, seed, or the like, is loosened and separated from the straw.

The harvested crop which has been separated by the threshing and separating assembly 24 falls onto a series of pans 48 and associated sieves 50, with the separated harvested crop being spread out via oscillation of the pans 48 and/or sieves 50 and eventually falling through apertures defined in the sieves 50. Additionally, a cleaning fan 52 may be positioned adjacent to one or more of the sieves 50 to provide an air flow through the sieves 50 that removes chaff and other impurities from the harvested crop. For instance, the fan 52 may blow the impurities off of the harvested crop for discharge from the harvester 10 through the outlet of a straw hood 54 positioned at the back end of the harvester 10.

The cleaned harvested crop passing through the sieves 50 may then fall into a trough of an auger 56, which may be configured to transfer the harvested crop to an elevator 58 for delivery to the associated crop tank 28. Additionally, in one embodiment, a pair of tank augers 60 at the bottom of the crop tank 28 may be used to urge the cleaned harvested crop sideways to an unloading tube 62 for discharge from the harvester 10.

It should be appreciated that the configuration of the harvester 10 described above and shown in FIG. 1 is provided only to place the present subject matter in an exemplary field of use. Thus, it should be appreciated that the present subject matter may be readily adaptable to any manner of harvester configuration.

Figure 2:
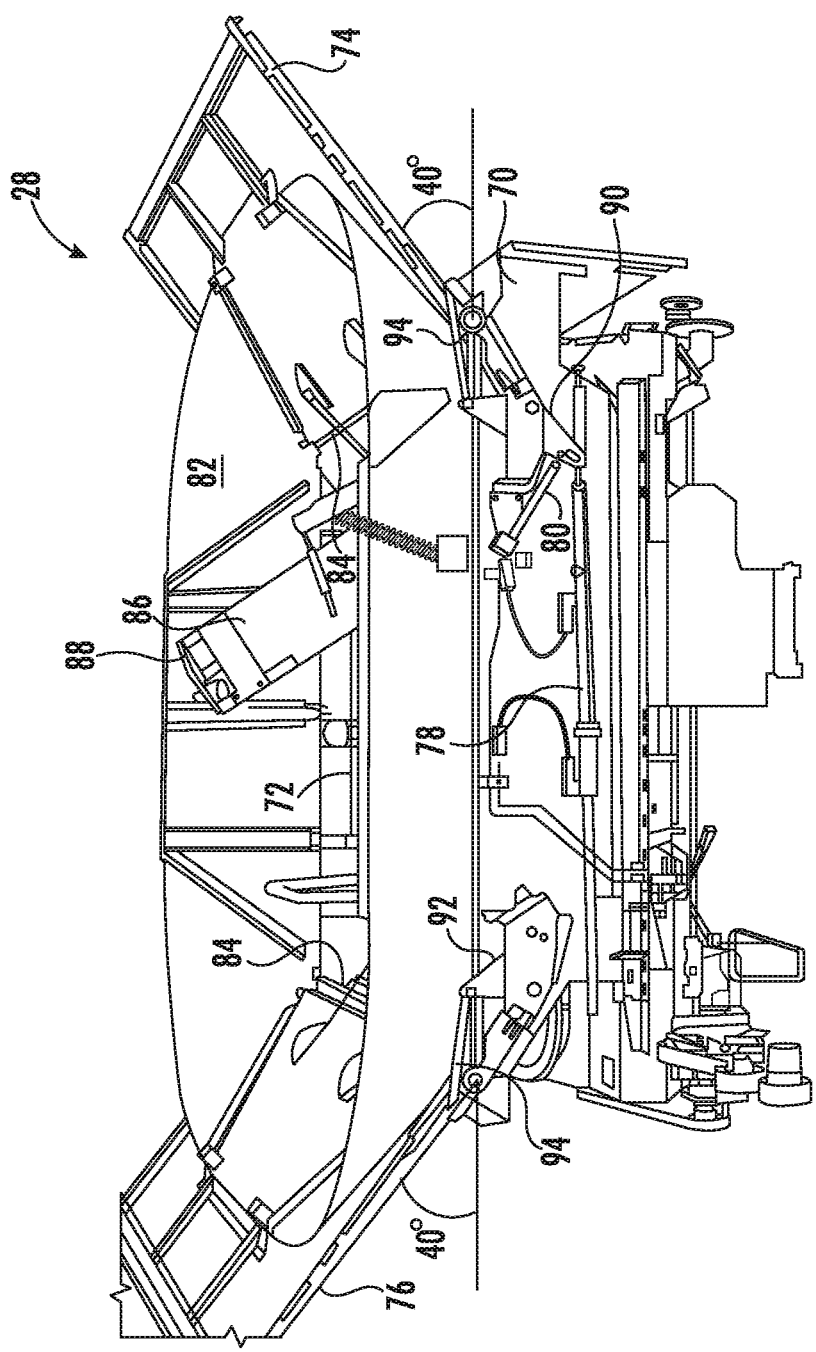
FIG. 2 illustrates a crop tank configured for use with an agricultural harvester in accordance with aspects of the present subject matter, particularly illustrating a crop tank with stowable tank cover sections.

Referring now to FIG. 2, a crop tank configured for use with an agricultural harvester is illustrated in accordance with aspects of the present subject matter. Particularly, FIG. 2 illustrates a crop tank with stowable tank cover sections. In general, the crop tank will be described herein with reference to the harvester 10 and crop tank 28 described above with reference to FIG. 1. However, it should be appreciated by those of ordinary skill in the art that the disclosed crop tank may generally be utilized with harvesters having any other suitable harvester configuration.

As shown in FIG. 2, the crop tank 28 generally includes a frame 70 having an opening 72 formed therethrough, a pair of tank cover sections 74 and 76 that are movably associated with the frame 70, a tank cover actuator 78 linked to the tank cover sections 74, 76, and a force assistor 80 linked to the tank cover section 74. The tank cover section 74 is connected to front and rear covers of the crop tank 28 by a linkage system (not shown) inside the crop tank 28, so that the tank cover sections 74, 76 always move together, as explained in more detail below. As can be seen, the frame 70 forms the body of the crop tank 28 and can be expanded by the tank cover sections 74, 76 and/or any additional tank cover sections of the crop tank 28. Further, a bubble-up extension as well as an expandable element 82 may be raised and lowered with the tank cover sections 74, 76. In this sense, the capacity of the crop tank 28 can be increased by raising the tank cover sections 74, 76 as well as the expandable element 82, which is shown as four rubber corners moving together with the tank cover sections 74, 76.

The tank cover sections 74, 76 are movably associated with the frame 70 so that they can switch between an open position (shown in FIGS. 4 and 6), and a covered position (shown in FIGS. 3 and 5) relative to the opening 72. As shown, the tank cover sections 74, 76 are hinged to the frame 70 by hinges 84 so the tank cover sections 74, 76 can pivot about axes of rotation defined by the hinges 84 to an opening angle relative to the opening 72, shown as 40 degrees in FIG. 2. While the tank cover sections 74, 76 are shown as being hinged to the frame 70, it is contemplated that the tank cover sections 74, 76 could be movably associated with the frame 70 in other ways, such as by sliding. As can be seen, an auger (e.g., a bubble-up auger 86) is mounted to the tank cover section 74 so that as the tank cover section 74 pivots about its hinge 84, the bubble-up auger 86 can be raised and lowered within the crop tank 28 relative to the opening 72. This allows for an output end 88 of the bubble-up auger 86 to raise and lower as the capacity of the crop tank 28 changes, which can correspond to increasing and decreasing amounts of grain held within the crop tank 28. This is important for fill distribution and to lower power consumption by preventing the output end 88 from being buried under too much grain or being held too high above the grain level.

As indicated above, the tank cover actuator 78 is connected to the frame 70 and is linked to the tank cover section 74 to selectively provide a switching force to the tank cover section 74 that forces the tank cover section 74 between the open position and covered position. Both tank cover sections 74, 76 can be linked to the tank cover actuator 78 to switch between the open and covered positions. The tank cover actuator 78 can be linked to the tank cover sections 74, 76 by cover links 90 and 92 so that the tank cover actuator 78 does not need to be directly linked to the tank cover sections 74, 76 to provide the switching force to the tank cover sections 74, 76. The cover links 90, 92, as shown, are linkage triangles that are connected to their respective tank cover sections 74, 76 by hinge shafts 94, allowing the switching force that acts on the cover links 90, 92 from the tank cover actuator 78 to be transmitted to the tank cover sections 74, 76 to switch the tank cover sections 74, 76 between the open position and covered position. Since the tank cover sections 74, 76 are both linked to the tank cover actuator 78, the tank cover actuator 78 can raise the tank cover sections 74, 76 simultaneously relative to the opening 72.

However, it should be appreciated that, in alternative embodiments, the crop tank may have any other suitable configuration. Further, though one tank cover actuator 78 is illustrated in the embodiment of FIG. 2, any combination of actuators may be provided in association with the one or more tank cover sections or other movable components of the crop tank to switch the tank cover section(s) and/or movable component(s) between the open position and covered position and/or deployed and stowed positions, respectively.

Figure 3:
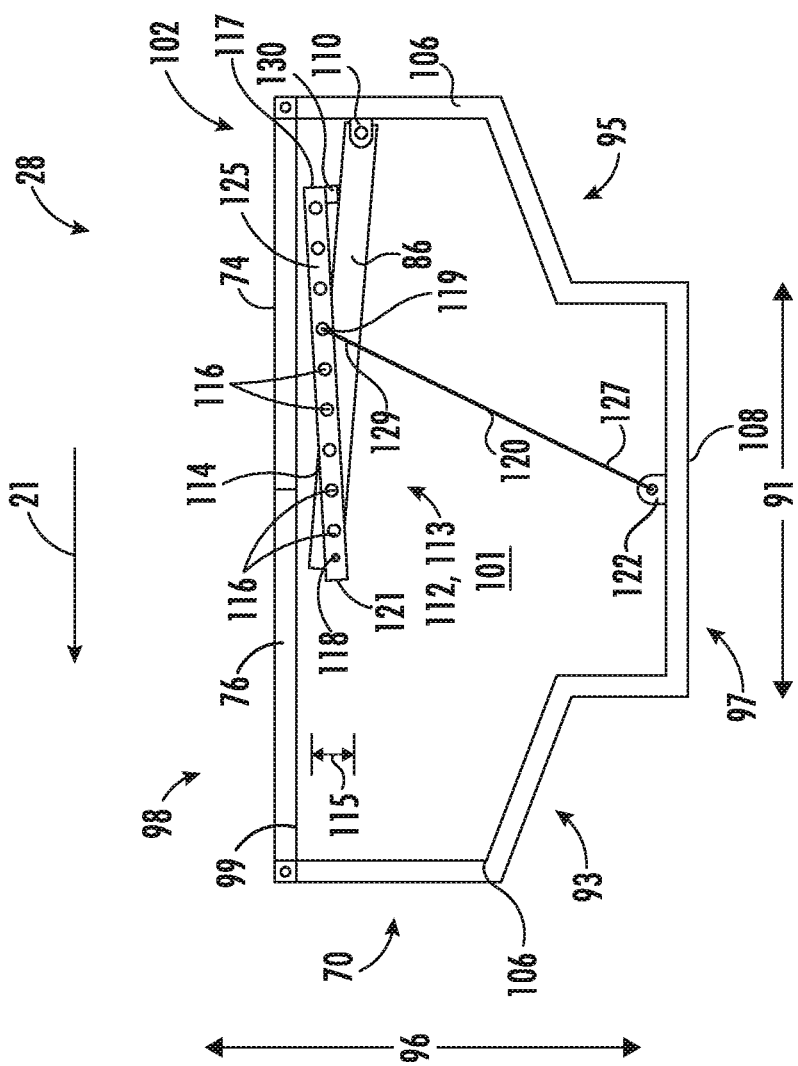
FIG. 3 illustrates a schematic, side view of one embodiment of a crop tank configured for use with agricultural harvesters and an associated sensor array in accordance with aspects of the present subject matter, particularly illustrating tank cover sections of the crop tank in a covered position.
Figure 4:
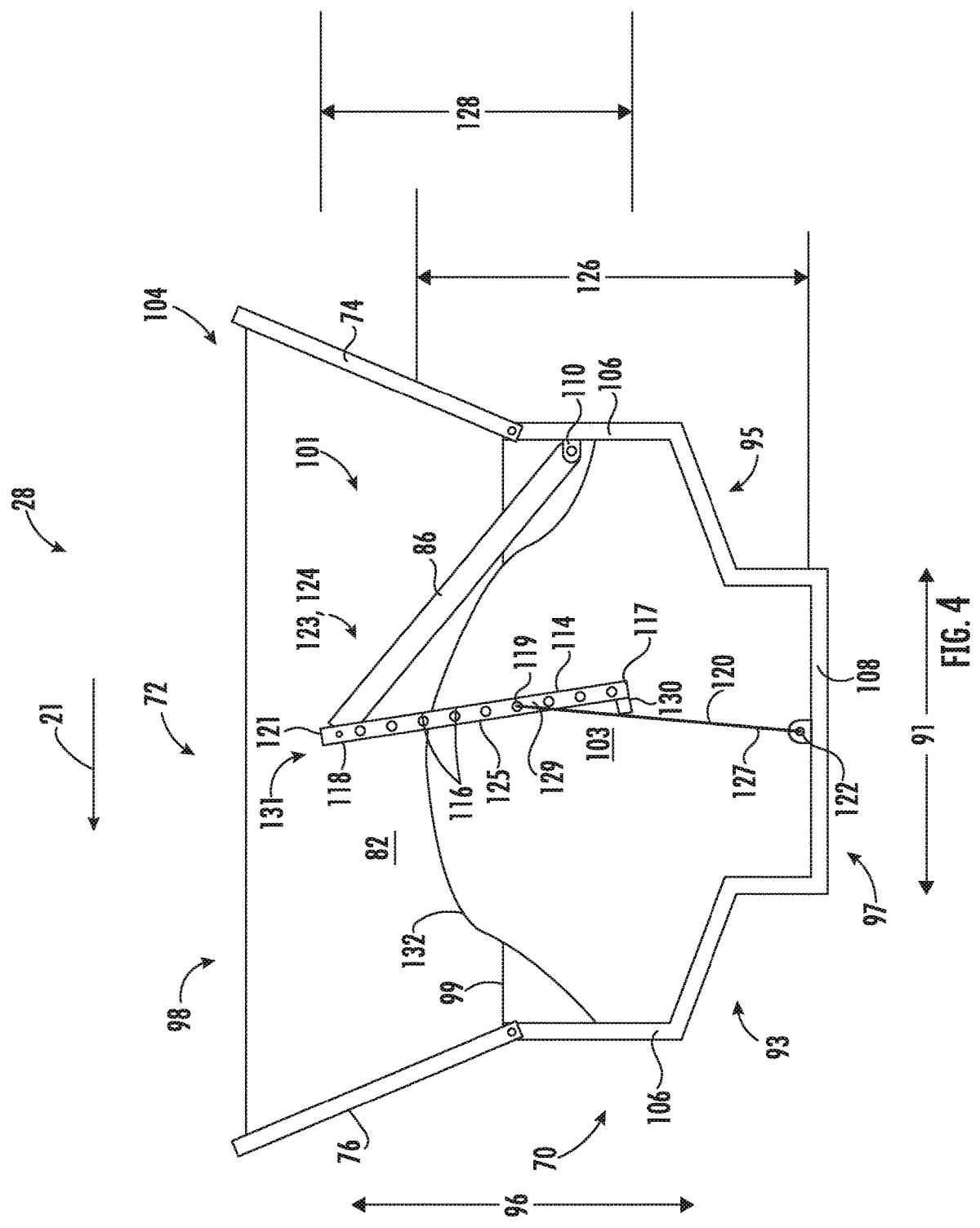

Referring now to FIGS. 3 and 4, schematic, side views of one embodiment of a crop tank suitable for use with an agricultural harvester are illustrated in accordance with aspects of the present subject matter. Particularly, FIGS. 3 and 4 illustrate a crop tank and an associated, stowable sensor array for determining the height or amount of grain stored within the crop tank, with FIG. 3 illustrating the tank cover sections 74, 76 of the crop tank 28 in a covered position 102, and FIG. 4 illustrating the tank cover sections 74, 76 of the crop tank 28 in an open position 104. In general, the crop tank will be described herein with reference to the harvester 10 and crop tank 28 described above with reference to FIGS. 1 and 2. However, it should be appreciated by those of ordinary skill in the art that the disclosed stowable sensor array may be utilized with crop tanks and/or harvesters having any other suitable crop tank or harvester configuration.

As shown in FIGS. 3 and 4, the crop tank 28 of the harvester 10 may extend in a longitudinal direction (e.g., as indicated by arrow 91) between a forward end 93 and an aft end 95, with the forward end 93 being positioned in front of the aft end 95 relative to the forward direction of travel 21 of the harvester 10. The crop tank 28 may also extend in a vertical direction (e.g., as indicated by arrow 96) between a bottom end 97 and a top end 98. In addition, the crop tank 28 may include one or more walls, such as a bottom wall 108 positioned at the bottom end 97 of the tank 28 and side walls 106 extending vertically upward from the bottom wall 108 to a top edge 99 positioned at the top end 98 of the crop tank 28. In one embodiment, the tank cover sections 74, 76 may be extended and define the opening 72 (FIG. 4) of the crop tank 28. Furthermore, the walls 106, 108 may define a crop chamber 101 in which harvested crop 103 is stored.

As shown, a movable component may be associated with the crop tank 28 and operably connected to at least one of the tank cover sections 74, 76. For example, the movable component may include the bubble-up auger 86 supported relative to the crop tank 28, as described above with reference to FIG. 2. For example, the bubble-up auger 86 may be pivotably coupled to one of the frame 70 or one of the tank cover section 74, 76 at an auger pivot point 110 to allow rotation of the bubble-up auger 86 about the auger pivot point 110 when actuated by the tank cover actuator 78 (FIG. 2). As such, the bubble-up auger 86 may be configured to be in a stowed position 112 when the tank cover sections 74, 76 are in the covered position 102 (FIG. 3) and in a deployed position 123 when the tank cover sections 74, 76 are in the open position 104 (FIG. 4).

Figure 8:
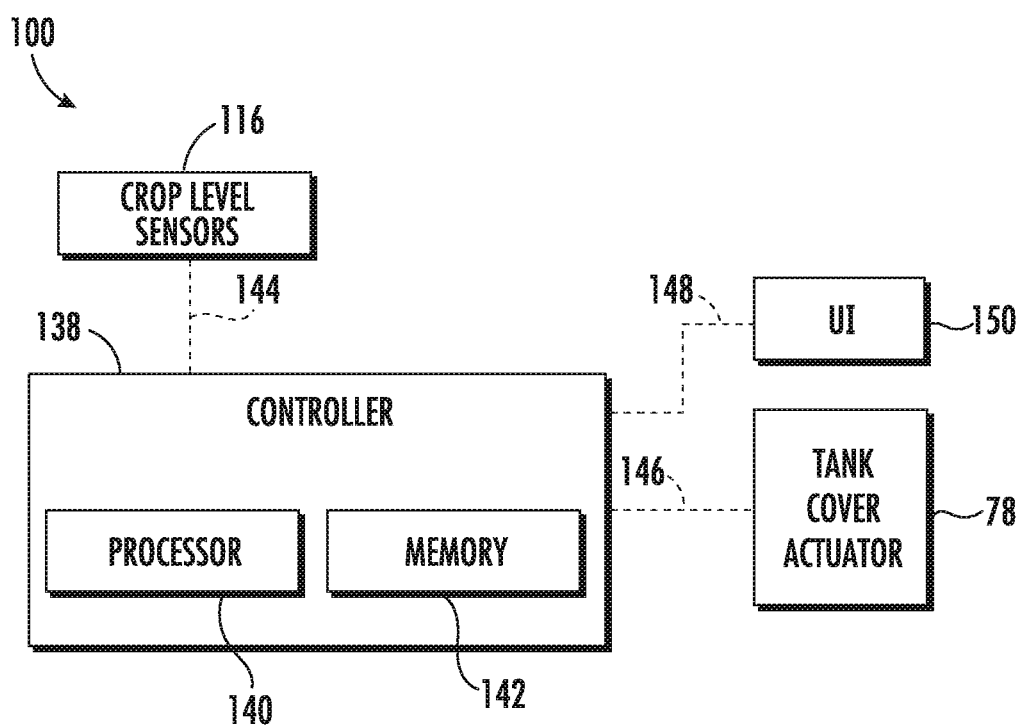
FIG. 8 illustrates a schematic view of one embodiment of a system for sensing harvested crop levels within a crop tank of an agricultural harvester in accordance with aspects of the present subject matter.

Furthermore, a sensor array 114 may be supported, at least in part, relative to the movable component (e.g., the bubble-up auger 86 in the embodiments of FIGS. 3 and 4) such that the sensor array 114 is configured to have a first orientation 113 (FIG. 3) when the tank cover sections 74, 76 are in the covered position 102 and a second orientation 124 (FIG. 4) when the tank cover sections 74, 76 are in the opened position 104. In accordance with aspects of the present subject matter, the sensor array 114 may include a plurality of crop level sensors 116 spaced apart from one another between a first end 121 and an opposed, second end 117 of the sensor array 114. For example, the sensor array 114 may include a housing 125 extending between the first and second ends 121, 117 along a longitudinal length of the sensor array 114. Moreover, the crop level sensors 116 may be spaced apart from one another along the longitudinal length of the housing 125. When in the second orientation 124, the crop level sensors 116 may be arranged to detect a height 126 of the harvested crop 103 (FIG. 4) stored within the crop chamber 101 at a location associated with the sensor array 114. For example, the crop level sensors 116 may be configured to transmit associated crop height data to a corresponding system controller 138 (such as via one or more communicative links 144 as shown in FIG. 8).

For example, in the embodiment of FIGS. 3 and 4, the sensor array 114 may be coupled to, such as pivotably coupled to, the bubble-up auger 86 such that repositioning the bubble-up auger 86 from the stowed position 112 to the deployed position 123 simultaneously repositions the sensor array 114 from the first orientation 113 to the second orientation 124. As such, by coupling the sensor array 114 to the auger 86 in the manner described above, the sensor array 114 may be stowed (e.g., in the first orientation 113) when the tank cover sections 74, 76 are in the covered position 102. Moreover, the stowable sensor array 114 may take up less room within the crop chamber 101 when the tank cover sections 74, 76 are in the covered position 102 and therefore may not interfere with the operation of movable parts of the crop tank 28. Further, by coupling the sensor array 114 to the auger 86, the sensor array 114 can be automatically deployed (e.g., into the second orientation 124) when the tank cover sections 74, 76 are moved to the open position 104. Such a configuration may allow for the sensor array 114 to be oriented and placed in an appropriate location to capture data indicative of the harvested crop levels within the crop chamber 101 when in the second orientation 124 and stowed away in a more convenient, stowed location when in the first orientation 113. As shown particularly in FIG. 4, when in the second orientation 124, the sensor array 114 may generally be configured to be positioned at or approximately at a center 131 of the crop tank 28. More specifically, the sensor array 114 may be positioned to capture data indicative of the harvested crop level within the crop tank 28 at or approximately at the center 131 of the crop chamber 101. In general, the harvested crop level at the center 131 of the crop chamber 101 may be indicative of the amount of harvested crop 103 within the crop chamber 101.

As shown in FIGS. 3 and 4, deploying the sensor array 114 from the first orientation 113 to the second orientation 124 may generally be associated with pivoting the sensor array 114 about a first pivot point 118 of the sensor array 114, with the sensor array 114 being coupled to the bubble-up auger 86 at the first pivot point 118. For instance, as shown, the sensor array 114 may be pivotably coupled to the frame 70 at a second pivot point 119 of the sensor array 114 such that deploying the bubble-up auger 86 from the stowed position 112 to the deployed position 123 automatically pivots the sensor array 114 about the first pivot point 118 from the first orientation 113 to the second orientation 124. For example, a frame link 120 may be pivotably coupled to the bottom wall 108 at a frame pivot point 122 at a first link end 127 of the frame link 120. Further, a second link end 129 of the frame link 120 may be pivotably coupled to the sensor array 114 at the second pivot point 119. While the embodiment of the crop tank 28 of FIGS. 3 and 4 is shown as including one frame link 120, it should be appreciated that other embodiments may include multiple frame links 120 pivotably coupled in series between the second pivot point 119 of the sensor array 114 and the frame pivot point 122 of the frame 70. Additionally, it should also be recognized that the frame pivot point 122 may be positioned at any suitable point on the frame 70, such as on one of the side walls 106. Moreover, as shown, the sensor array 114 may include a stop 130 at a position along the longitudinal length of the housing 125, illustrated at the second end 117. As such, the stop 130 may be configured to contact the frame link 120 when the sensor array 114 has been pivoted to the second orientation 124 (e.g., as shown in FIG. 4) in order to prevent the sensor array 114 from over-rotating about the first pivot point 118. As such, the stop 130 may set the position for the sensor array 114 when in the second orientation 124.

In an alternative embodiment, the sensor array 114 may be operatively associated with the same actuation means as the bubble-up auger 86 (e.g., the tank cover actuator 78 as described above in reference with FIG. 2) such that deploying the bubble-up auger 86 from the stowed position 112 to the deployed position 123 also pivots the sensor array 114 from the first orientation 113 to the second orientation 124. As an example, an actuator (not shown) may be provided on the bubble-up auger 86 and operably associated with the sensor array 114 in order to pivot the sensor array 114 from the first orientation 113 to the second orientation 124 simultaneously with or subsequent to deploying the bubble-up auger 86 from the stowed position 112 to the deployed position 123.

Generally, the sensor array 114 may be pivoted from the first orientation 113 to the second orientation 124 with movement of the auger 86 from the stowed position 112 to the deployed position 123 such that a vertical dimension of the sensor array 114 defined in the vertical direction 96 between the first and second ends 117, 121 of the sensor array 114 increases as the sensor array 14 moves to the second orientation 124. For instance, as illustrated in FIG. 3, when the sensor array 114 is disposed in the first orientation 113, the sensor array 114 may define a first vertical dimension 115 in the vertical direction 96. More particularly, the sensor array 114 may define the first vertical dimension 115 between the first end 121 and the second end 117 of the sensor array 114 in the vertical direction 96. Further, as illustrated in FIG. 4, when the sensor array 114 is pivoted to the second orientation 124, the sensor array 114 may define a second vertical dimension 128 in the vertical direction 96 between the first end 121 and the second end 117 of the sensor array 114, with the second vertical dimension 128 being greater than the first vertical dimension 115.

While the sensor array 114 is illustrated as being coupled to the bubble-up auger 86 in FIGS. 3 and 4, it should be appreciated that the sensor array 114 may be coupled to any movable component that is configured to move with the opening and closing of the tank cover sections 74, 76, such as the expandable element 82, or the sensor array 114 may be coupled to one of the tank cover sections 74, 76 (e.g., as will be described below with reference to FIGS. 5 and 6).

In accordance with aspects of the present subject matter, one or more of the crop level sensors 116 may be configured to emit one or more sensor beams into the crop chamber 101 of the crop tank 28 when the sensor array 114 is pivoted to the second orientation 123. In general, the sensor beam(s) is configured to be reflected off of a top surface 132 of the harvested crop 103 stored in the crop chamber 101 as one or more reflected sensor beams. The crop level sensors 116 may then be configured to receive the reflected sensor beam(s). As such, the crop level sensor(s) 116 may be configured to transmit associated crop height data based on the reflected sensor beams. For example, based on the position of a respective crop level sensor 116 and the time between emitting the sensor beam and receiving the reflected sensor beam, the height 126 of the harvested crop 103 at a location on the top surface 132 associated with the sensor beams may be determined.

As another example, in accordance with aspects of the present subject matter, one or more of the crop level sensors 116 may be configured as proximity sensors suitable to detect the presence of harvested crop 103 within the vicinity of the crop level sensor 116. In general, such proximity sensor(s) is configured to detect the presence of the harvested crop 103 as the height 126 of the harvested crop 103 increases and sequentially covers the crop level sensors 116 of the sensor array 114. As such, the crop level sensor(s) 116 may be configured to transmit associated crop height data based on the presence of harvested crop 103 within the sensor range(s) of the proximity sensor(s). For example, based on the number and position of respective crop level sensors 116 covered by the harvested crop 103, the height 126 of the harvested crop 103 at a location of the vertically uppermost covered crop level sensor 116 may be determined based on the height of such covered crop level sensor 116.

Additionally, it should be appreciated that each of the crop level sensors 116 may generally correspond to any sensing device suitably configured to function as described herein. For example, in one embodiment, each crop level sensor 116 may correspond to an ultrasonic sensor(s) configured to emit one or more ultrasonic beams for reflection off of the top surface 132 of the harvested crop 103. As another example, each of the crop level sensors 116 may correspond to an optical sensor(s) configured to detect the presence of light (indicating a non-covered crop level sensor 116) or the absence of light (indicating a covered crop level sensor 116). As such, each of the crop level sensors 116 may be configured as one or more proximity sensors, optical sensors, RADAR sensors, LIDAR sensors, ultrasonic transceivers (as a single unit or as a separate ultrasonic transmitter and receiver), or any other suitable sensor capable of capturing data indicative of the height 126 of the harvested crop 103 at a location associated with the sensor array 114.

Figure 5:
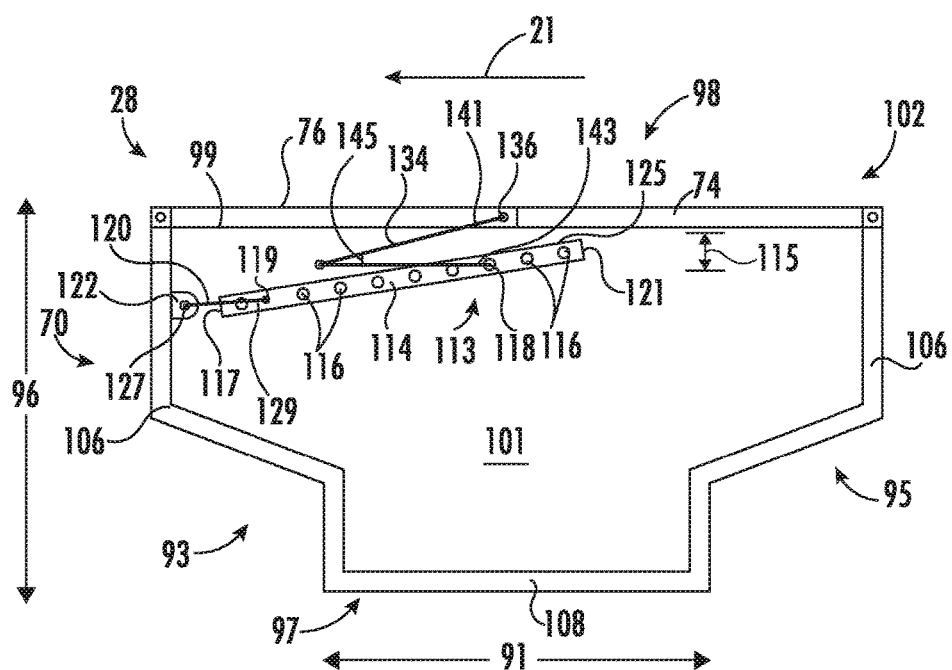
FIG. 5 illustrates a schematic, side view of another embodiment of a crop tank configured for use with agricultural harvesters and an associated sensor array pivotably coupled to a tank cover section in accordance with aspects of the present subject matter, particularly illustrating the tank cover sections of the crop tank in a covered position.
Figure 6:
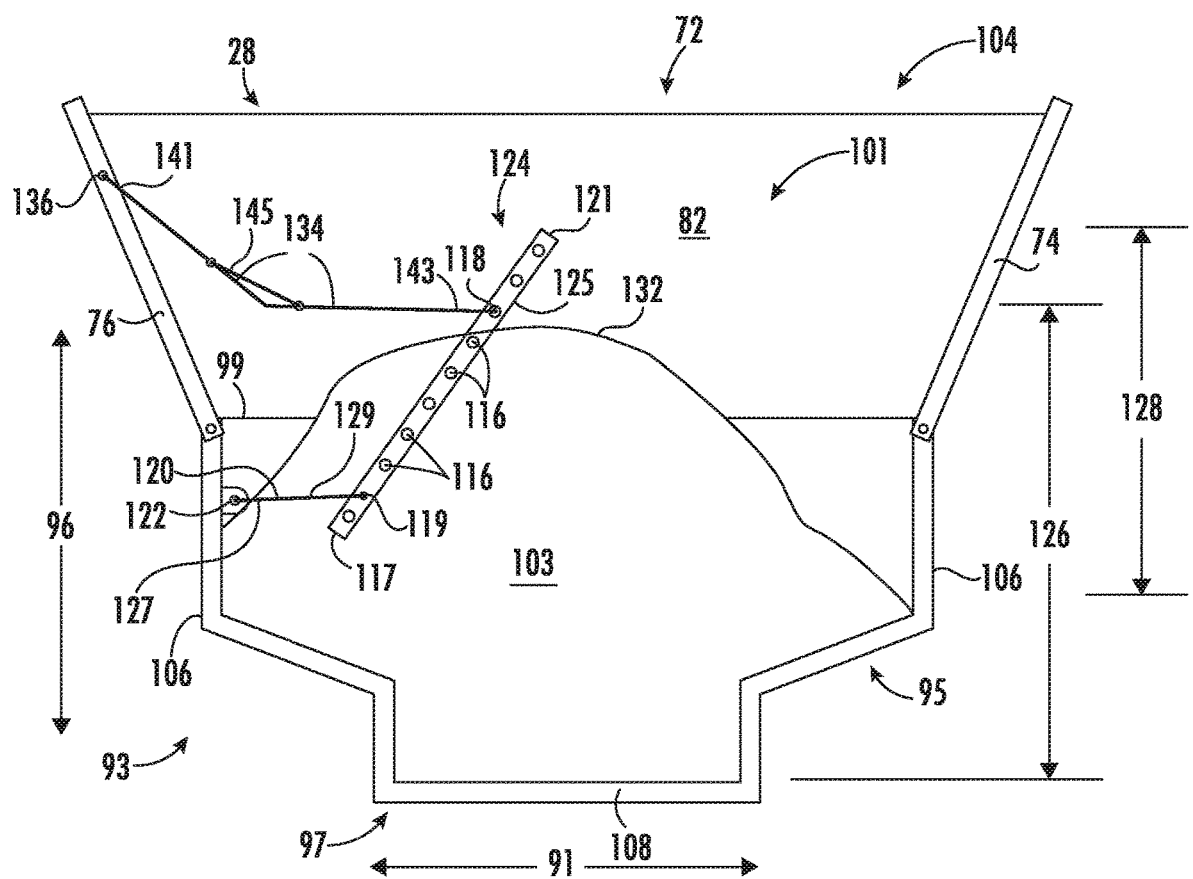
FIG. 6 illustrates another, schematic, side view of the crop tank of FIG. 5 in accordance with aspects of the present subject matter, particularly illustrating the tank cover sections of the crop tank in an open position.

Referring now to FIGS. 5 and 6, schematic, side views of an additional or alternative embodiment of a stowable sensor array associated with a crop tank of an agricultural harvester is illustrated in accordance with aspects of the present subject matter. In general, the crop tank will be described herein with reference to the harvester 10 and crop tank 28 described above with reference to FIGS. 1 and 2. FIG. 5 illustrates the tank cover sections 74, 76 of the crop tank 28 in a covered position 102, and FIG. 6 illustrates the tank cover sections 74, 76 of the crop tank 28 in an open position 104. The embodiment of the crop tank 28 and sensor array 114 illustrated in FIGS. 5 and 6 may be configured similarly to the crop tank 28 and sensor array 114 of the embodiment of FIGS. 3 and 4. For example, the crop tank 28 may include a frame 70 extending in the vertical direction 96 between a bottom end 97 and a top end 87 of the crop tank 28 and in a longitudinal direction 91 between opposed sidewalls 106 of the crop tank 28. The crop tank 28 may also include a bubble-up auger 86 (omitted for clarity). Additionally, crop tank 28 includes a sensor array 114 having crop level sensor 116 configured to capture data indicative of the harvested crop level within the crop tank 28. Similar to the embodiment described above, the sensor array 114 is generally configured to pivot from a first, stowed (or less vertical) orientation 113 to a second, deployed (or more vertical) orientation 124 as the crop tank cover sections 74, 76 are deployed from the covered position 102 to the open position 104. However, unlike the embodiment described above in which the sensor array 114 is coupled to the auger 86, the sensor array 114 of FIGS. 5 and 6 is configured to be pivotably coupled to one of the crop tank cover sections 74, 76.

Specifically, as shown in FIGS. 5 and 6, the sensor array 114 may be pivotably coupled to one of the crop tank cover sections 74, 76 (forward crop tank cover section 76 in the illustrated embodiment) at a first pivot point 118 such that deploying the crop tank cover section 76 from the covered position 102 to the open position 104 automatically pivots the sensor array 114 about the first pivot point 118 from the first orientation 113 to the second orientation 124. Similar to the embodiment described above, deploying the sensor array 114 from the first orientation 113 to the second orientation 124 may be associated with orienting the sensor array 114 such that the sensor array 114 defines a second vertical dimension 128 in the vertical direction 96 between first and second ends 121, 117 of the sensor array 114 that is greater than a first vertical dimension 115 of the sensor array 114 when disposed at the first orientation 113. For example, one or more tank cover links 134 may be pivotably coupled to the tank cover section 76 at a tank cover pivot point 136 at a first link end 141 of the tank cover link(s) 134. Further, a second link end 143 of the tank cover link(s) 134 may be pivotably coupled to the sensor array 114 at the first pivot point 118. Further, as described in more detail above with reference to FIGS. 3 and 4, the sensor array 114 may be pivotably coupled to the frame 70 at a second pivot point 119 of the sensor array 114 (e.g., via link 129) such that deploying the tank cover section 76 from the covered position 102 to the open position 104 automatically pivots the sensor array 114 about the first pivot point 118 from the first orientation 113 to the second orientation 124.

Moreover, as shown, in embodiments including more than one tank cover link 134, one or more cover link stops 145 may be provided in association with the tank cover links 134 to limit the relative rotation between the tank cover links 134. For example, the cover link stop 145 may allow the tank cover links 134 to rotate to a predetermined degree and prohibit rotation past the predetermined degree. As such, the cover link stop 145 may prevent relative rotation between the tank cover links 134 and promote rotation between the sensor array 114 at the first and second pivot points 118, 119 to position the sensor array 114 at the desired second orientation 124. However, in other embodiments, a single tank cover link 134 may be pivotably coupled between the first pivot point 118 and the tank cover pivot point 136.

Figure 7:
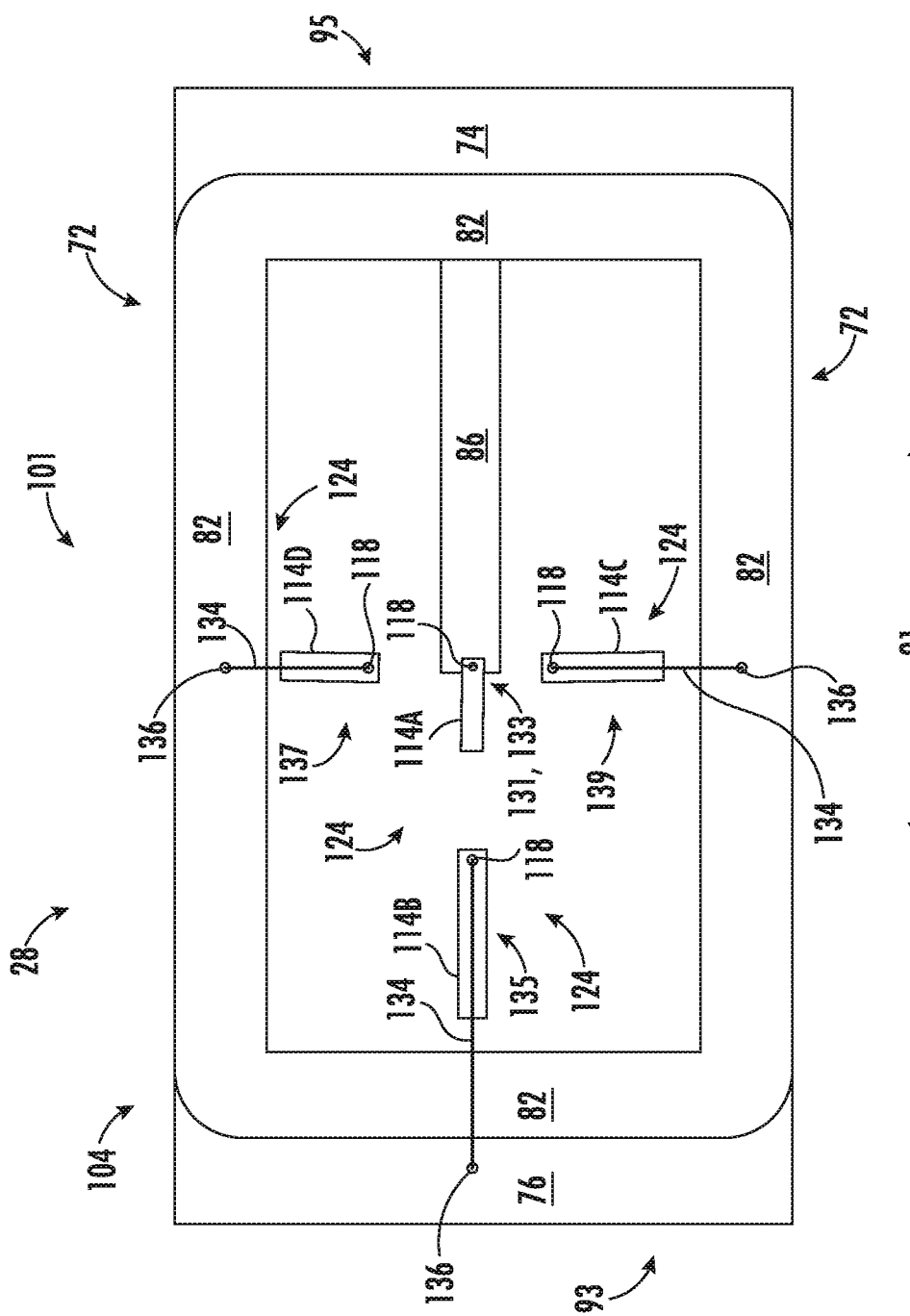
FIG. 7 illustrates a schematic, top view of another embodiment of a crop tank configured for use with agricultural harvesters in accordance with aspects of the present subject matter, particularly illustrating a plurality of associated sensor arrays provided in operative association with the crop tank.

Referring now to FIG. 7, an exemplary top-view of another embodiment of the crop tank 28 described above with reference to FIGS. 1-6 is illustrated schematically in accordance with aspects of the present subject matter. Particularly, FIG. 7 illustrates the crop tank 28 including a plurality of sensor arrays 114, such as two or more sensor arrays 114 configured the same or similar to the sensor arrays 114 described above with reference to FIGS. 3-6. It should be appreciated that the sensor arrays 114 of the crop tank 28 of FIG. 7 are illustrated with the frame link(s) 120 omitted for clarity.

Each of the plurality of sensor arrays (e.g., sensor arrays 114A, 114B, 114C, 114D) may include crop level sensors 116 (omitted for clarity) configured to capture data indicative of the harvested crop level at a different location within the crop tank 28. In addition, each sensor array 114 may be generally configured to pivot from the first orientation 113 to the second orientation 124 as the crop tank cover sections 74, 76 are deployed from the covered position 102 to the open position 104. For example, a first sensor array 114A may be pivotably covered to the bubble-up auger 86 at a first pivot point 118 of the first sensor array 114A such that the crop level sensors 116 of the first sensor array 114A capture data indicative of the height 126 of the harvested crop 103 (see FIGS. 4 and 6) at a first location 133 of the crop chamber 101 of the crop tank 28. As shown, the first location 133 may correspond to the center 131 of the crop chamber 101. Additionally, a second sensor array 114B may be pivotably coupled to the tank cover section 76 at a first pivot point 118 of the second sensor array 1149 such that the crop level sensors 116 of the second sensor array 114B capture data indicative of the height 126 of the harvested crop 103 at a second location 135 of the crop chamber 101 of the crop tank 28. As a further example, a third sensor array 114C may be pivotably coupled to the expandable element 82 at a side of the crop tank 28 at a first pivot point 118 of the third sensor array 114C such that the crop level sensors 116 of the third sensor array 114C capture data indicative of the height 126 of the harvested crop 103 at a third location 137 of the crop chamber 101 of the crop tank 28. Additionally, a fourth sensor array 114D may be pivotably coupled to the expandable element 82 at an opposite side of the crop tank 28 at a first pivot point 118 of the fourth sensor array 114D such that the crop level sensors 116 of the fourth sensor array 114D capture data indicative of the height 126 of the harvested crop 103 at a fourth location 139 of the crop chamber 101 of the crop tank 28. The crop level sensors 116 of the sensor arrays 114A, 114B, 114C, 114D may be configured to transmit associated crop height data at the locations 131, 135, 137, 139 to the corresponding system controller 138 (such as via one or more communicative links 144 as shown in FIG. 8).

It should be appreciated that, although the embodiments shown in FIGS. 3-7 illustrate multiple positions for placing sensor arrays 114 within the crop tank 28, all of the sensor arrays 114 need not be included in association with the crop tank 28 and/or the harvester 10. Furthermore, it should be appreciated that additional or alternative sensor arrays 114 may be provided at additional or alternative locations of the crop tank 28 and coupled to additional or alternative movable components of the crop tank 28 so long as each sensor array 114 is generally configured to pivot from the first orientation 113 to the second orientation 124 as the crop tank cover sections 74, 76 are deployed from the covered position 102 to the open position 104.

Referring now to FIG. 8, a schematic view of one embodiment of a system 100 for sensing harvested crop levels within an agricultural harvester is illustrated in accordance with aspects of the present subject matter. In general, the system 100 will be described herein with reference to the harvester 10 and crop tank 28 described above with reference to FIGS. 1 and 2. Further, the system 100 will be described with reference to the sensor arrays 114 described above in reference to FIGS. 3-7. However, it should be appreciated by those of ordinary skill in the art that the disclosed system 100 may generally be utilized with harvesters, crop tanks, and/or sensor arrays having any other suitable harvester, crop tank, or sensor array configuration, respectively.

In several embodiments, the system 100 may include a controller 138 and various other components configured to be communicatively coupled to and/or controlled by the controller 138, such as one or more sensor arrays 114 and associated crop level sensors 116 and/or various components of the harvester 10 and/or the crop tank 28, such as the tank cover actuator 78.

In general, the controller 138 may comprise any suitable processor-based device known in the art, such as a computing device or any suitable combination of computing devices. Thus, in several embodiments, the controller 138 may include one or more processor(s) 140 and associated memory device(s) 142 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 142 of the controller 138 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 142 may generally be configured to store suitable computer-readable instructions that, when implemented by the processor(s) 140, configure the controller 138 to perform various computer-implemented functions, such as one or more aspects of the method 200 described below with reference to FIG. 9. In addition, the controller 138 may also include various other suitable components, such as a communications circuit or module, one or more input/output channels, a data/control bus and/or the like.

It should be appreciated that the controller 138 may correspond to an existing controller of the harvester 10 or the controller 138 may correspond to a separate processing device. For instance, in one embodiment, the controller 138 may form all or part of a separate plug-in module that may be installed within the harvester 10 to allow for the disclosed system and method to be implemented without requiring additional software to be uploaded onto existing control devices of the harvester 10.

Furthermore, in some embodiments, the system 100 may include one or more feedback devices configured to communicate feedback, such as feedback from the controller 138, to the operator of the harvester 10. For example, the controller 138 may be configured to notify the operator of the harvester 10 of the height 126 and/or volume of harvested crop 103 within the crop tank 28. Specifically, in one embodiment, the controller 138 may be communicatively coupled to a user interface 150 (see also FIG. 1) positioned within the operator's cab 22 of the harvester 10 via a wired or wireless connection to allow feedback signals (e.g., indicated by dashed line 148 in FIG. 5) to be transmitted from the controller 138 to the user interface 150. In such an embodiment, the feedback signals may instruct the user interface 150 to provide a notification to the operator of the harvester 10 (e.g., by causing a visual or audible notification or indicator to be presented to the operator) that provides an indication of the height 126 and/or volume of harvested crop 103 within the crop tank 28. However, it should be appreciated that the user interface 150 may be positioned in any suitable location, including positions remote from the harvester 10. Furthermore, it should be appreciated that the user interface 150 may include any suitable feedback device(s), such as display screens, speakers, warning lights, and/or the like.

In accordance with aspects of the present subject matter, the controller 138 may be configured to control the operation of the tank cover sections 74, 76 and/or the bubble-up auger 86 via, the tank cover actuator 78 based on whether the harvester 10 is in a harvesting state. As described generally above, actuation of the tank cover sections 74, 76 and/or the bubble-up auger 86 via operation of the tank cover actuator 78 may also result in the sensor array(s) 114 being pivoted from the first orientation 113 to the second orientation 124. As shown in FIG. 8, the controller 138 may be communicatively coupled to the tank cover actuator 78, via a wired or wireless connection to allow control signals (e.g., indicated by dashed lines 146 in FIG. 8) to be transmitted from the controller 138 to the tank cover actuator 78. As such, the controller 138 may be configured to transmit control signals 146 to tank cover actuator 78 or associated components instructing the tank cover actuator 78 to extend or retract the tank cover sections 74, 76 between the covered position 102 and the open position 104, reposition a movable component (such as the bubble-up auger 86 or expandable element 82) from the stowed position 112 to the deployed position 123, and/or pivot the sensor array(s) 114 from the first orientation 113 to the second orientation 124.

In several embodiments, the system 100 may be used to sense the current crop level of the harvested crop 103 within the crop chamber 101 of the crop tank 28. In general, the current crop level may be determined by the height 126 of the harvested crop 103 at one or more locations within the crop chamber 101, such as the center 131 of the crop chamber 101. For example, the height 126 of the harvested crop 103 may be determined by the height of the top surface 132 of the harvested crop 103 within the crop chamber 101 at the location of an associated sensor array 114. More specifically, as indicated above, the crop level sensors 116 may be configured to emit sensor beams into the crop chamber 101 for reflection off of the top surface 132 of the harvested crop 103. Thereafter, the crop level sensors 116 may be configured to receive or detect the associated reflected sensor beams corresponding to the emitted sensor beams as reflected off of the harvester crop 103. As such, the reflected sensor beams may be indicative of a height 126 of the harvested crop 103 within the crop chamber 101. For example, in one embodiment, a time duration defined between when the sensor beams are emitted by the crop level sensors 116 and when the reflected sensor beams are received by the crop level sensors 116 may be indicative of the height 126 of the harvested crop 103 at the location associated with the sensor array 114. As another example, as explained above, the crop level sensors 116 may be configured as proximity sensors suitable to detect the presence of harvested crop 103 within the vicinity of the crop level sensors 116. As such, the crop level sensor(s) 116 may be configured to capture height data based on the presence of harvested crop 103 within the sensor ranges of the proximity sensors. In one embodiment, the height 126 of the harvested crop 103 at the location associated with the sensor array 114 may be indicative of a total crop level, such as the height 126 of the crop at the center 131 of the crop chamber 101.

Furthermore, in one embodiment, the controller 138 of the system 100 may be configured to determine or monitor the current crop level within the crop chamber 101 of the crop tank 28 based on the sensor data received from the crop level sensors 116 of a single sensor array 114. Specifically, as shown in FIG. 8, the controller 138 may be communicatively coupled to the crop level sensors 116 via a wired or wireless connection to allow crop height data (e.g., indicated by dashed lines 144 in FIG. 8) to be transmitted from the crop level sensors 116 to the controller 138. For example, in one embodiment, the data 144 may be indicative of a time duration defined between when the sensor beams are emitted by the crop level sensors 116 and the reflected sensor beams are received by the crop level sensors 116 or whether the individual crop level sensors 116 have been covered by the harvested crop. Based on such sensor data 144, the controller 138 may then be configured determine the current crop level. For instance, the controller 138 may include a look-up table or suitable mathematical formula stored within its memory 142 that correlates the data 144 indicative of the height 126 of the harvested crop 103 at one or more locations within the crop chamber 101 to the current crop level of the harvested crop 103. Further, as explained above, the system 100 may be configured to provide a notification of the current crop level of the harvested crop 103 within the crop chamber 101 to the operator of the harvester 10 via feedback control signals 148 to the user interface 150

As a further example, controller 138 of the system 100 may be configured to determine or monitor the current crop level within the crop chamber 101 of the crop tank 28 based on the sensor data 144 received from the crop level sensors 116 of a plurality of sensor arrays 114. For example, in the embodiment shown in FIG. 7, the crop level sensors 116 of first, second, third, and/or forth sensor arrays 114A, 114B, 114C, 114D may be configured to communicate crop height data 144 to the controller 138 representing the height 126 of the harvest crop 103 at multiple locations (e.g., the first, second, third, and/or fourth locations 133, 135, 137, 139) within the crop chamber 101. The controller 138 may then be configured determine the current crop level based on the data 144 representing the height 126 of the harvested crop 103 at the multiple locations. In one embodiment, at least one of the locations may correspond to the center 131 of the crop chamber 101.

Additionally, or alternatively, the controller 138 may be configured to determine the total crop level and/or a volume of harvested crop 103 within the crop chamber 101 based on a shape or contour of the top surface 132 of the harvested crop 103. For example, the determined height 126 of the harvested crop 103 at the multiple locations (e.g., the first, second, third, and/or fourth locations 133, 135, 137, 139) may be indicative of a shape of the top surface 132 of the harvested crop 103. As such, the controller 138 may be configured to calculate or estimate the shape or contour of the top surface 132 of the harvested crop 103 based on the determined height 126 at the multiple locations. In one implementation, the total crop level or a volume of harvested crop 103 within the crop tank 28 may be more accurately determined based at least in part on the calculated or estimated shape of the top surface 132 as compared to determining the crop level based on the height 126 of the harvested crop 103 at the one or more locations alone.

Figure 9:
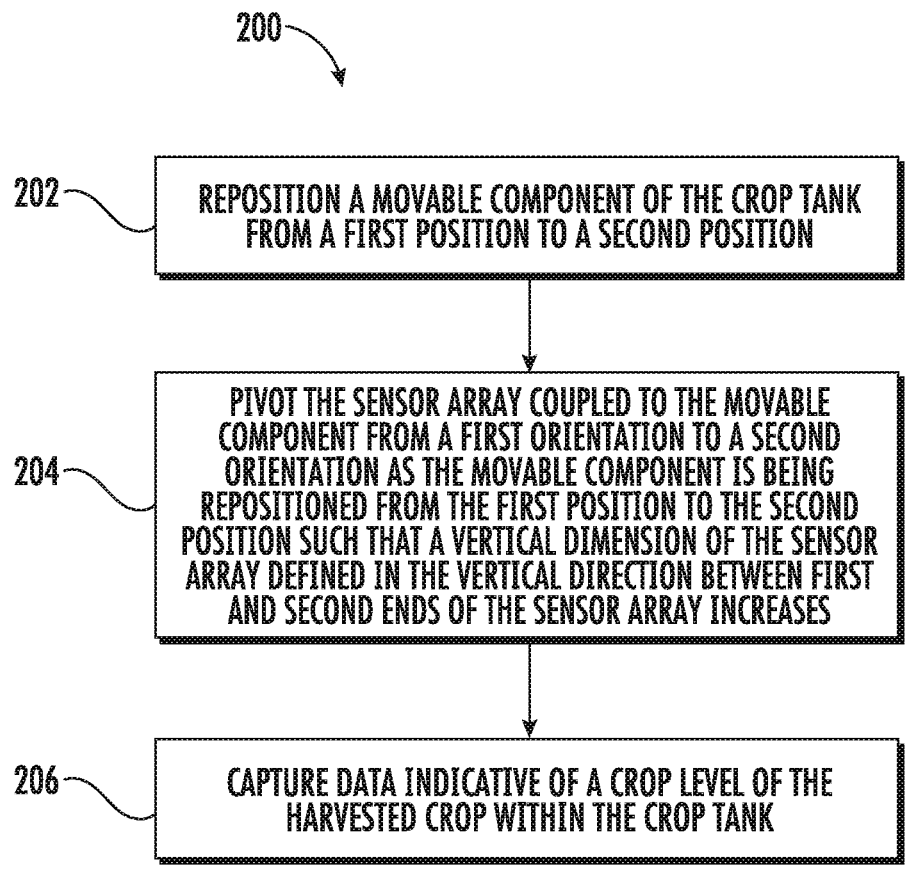
FIG. 9 is a flow chart illustrating one embodiment of a method for sensing a current crop level within a crop tank of an agricultural harvester in accordance with aspects of the present subject matter.

Referring now to FIG. 9, a flow diagram of one embodiment of a method 200 for sensing a current crop level within a crop tank of an agricultural harvester is illustrated in accordance with aspects of the present subject matter. In general, the method 200 will be described herein with reference to the harvester 10 and the system 100 described above with reference to FIGS. 1-8. However, it should be appreciated by those of ordinary skill in the art that the disclosed method 200 may generally be utilized to sense harvested crop levels within an agricultural harvester having any suitable harvester configuration and/or as part of a system having any suitable system configuration. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 9, at (202), the method 200 may include repositioning a movable component of the crop tank from a first position to a second position. As described herein with reference to FIG. 9, the movable component may include one or more of the tank cover sections 74, 76 (where the first position corresponds to the covered position 102 and the second position corresponds to the open position 104 of the tank cover sections 74, 76) or additional and/or alternative movable components, such as the bubble-up auger 86 or expandable element 82 (where the first position corresponds to the stowed position 112 and the second position corresponds to the deployed position 123). Specifically as explained above, the controller 138 may be configured to transmit control signals 146 to the tank cover actuator 78 or associated components instructing the tank cover actuator 78 to extend or retract the tank cover sections 74, 76 between the covered position 102 and the open position 104 and/or reposition another movable component from the stowed position 112 to the deployed position 123.

Additionally, at (204), the method 200 may include pivoting a sensor array coupled to the movable component from a first orientation to a second orientation as the movable component is being repositioned from the first position to the second position such that a vertical dimension of the sensor array defined in the vertical direction between first and second ends of the sensor array increases. For example, as described above, extending or retracting the tank cover sections 74, 76 between the covered position 102 and the open position 104 and/or repositioning another movable component from the stowed position 112 to the deployed position 123 may result in the sensor array 114 pivoting from its first orientation 113 to its second orientation 124 due to the coupling provided between the sensor array 114 and the movable component. As described above, when the sensor array 114 is pivoted to the second orientation 124, the sensor array 114 may define a second vertical dimension 128 in the vertical direction 96 between the opposed ends 121, 117 of the sensor array 114 that is greater than the first vertical dimension 115 defined by the sensor array 114 when at the first orientation 113.

Moreover, at (206), the method 200 may include capturing, with the sensor array, data indicative of a crop level of the harvested crop within the crop tank. For instance, as described above, the controller 138 may be communicatively coupled to the crop level sensors 116 of the sensor array 114, which are configured to capture data 144 indicative of the height 126 of the harvested crop 103 at a location associated with the sensor array 114 within the crop chamber 101. Further, the method 200 may include determining a current crop level of harvested crop 103 within the crop tank 28 based on the captured data 144 received from the plurality of crop level sensors 116. For instance, the controller 138 may be configured to determine a height 126 of the harvested crop 103 at the location (e.g., first location 133) associated with the sensor array 114 in the second orientation 124. Further, based on the height 126 of the harvested crop 103 at the location of the sensor array 114, the controller 128 may further be configured to calculate or estimate the current crop level.

It is to be understood that the steps of the method 200 are performed by the controller 138 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 138 described herein, such as the method 200, is implemented in software code or instructions which are tangibly stored on a tangible computer readable medium. The controller 138 loads the software code or instructions via a direct interface with the computer readable medium or via a wired and/or wireless network. Upon loading and executing such software code or instructions by the controller 138, the controller 138 may perform any of the functionality of the controller 138 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for sensing harvested crop levels within an agricultural harvester, the system comprising:
   a crop tank extending in a vertical direction between a top end and a bottom end of the crop tank, the crop tank including a frame having an opening formed therethrough and a tank cover section provided in operative association with the frame such that the tank cover section is movable between an open position and a covered position relative to the opening of the frame, the crop tank being configured to receive harvested crop; and
   a sensor array including a plurality of crop level sensors spaced apart from one another between a first end of the sensor array and a second end of the sensor array, each crop level sensor of the plurality of crop level sensors configured to capture data indicative of a crop level of the harvested crop received within the crop tank, the sensor array supported, at least in part, relative to the crop tank at a first pivot point and a second pivot point such that the sensor array is configured to have a first orientation when the tank cover section is in the covered position and a second orientation when the tank cover section is in the open position,
   wherein, when the sensor array is disposed in the first orientation, the sensor array defines a first vertical dimension in the vertical direction between the first and second ends of the sensor array that is less than a second vertical dimension defined by the sensor array in the vertical direction between the first and second ends of the sensor array when the sensor array is disposed in the second orientation.

2. The system of claim 1, wherein the sensor array is pivotably coupled to a movable component of the crop tank at the first pivot point, and wherein the sensor array is pivotably coupled to the frame of the crop tank at the second pivot point.

3. The system of claim 2, wherein the sensor array is pivotably coupled to the frame via a frame link, the frame link having a first link end pivotably coupled to the frame and a second link end pivotably coupled to the sensor array at the second pivot point.

4. The system of claim 3, wherein the sensor array further includes a stop, the stop configured to contact the frame link when the sensor array is in the second orientation to limit an extent of rotation of the sensor array about the first pivot point.

5. The system of claim 1, wherein the sensor array further comprises a housing extending between the first and second ends of the sensor array along a longitudinal length of the sensor array, wherein the plurality of crop level sensors are spaced apart from one another along the longitudinal length of the housing.

6. The system of claim 1, wherein the sensor array is configured to be positioned at or approximately at a center of the crop tank when in the second orientation.

7. The system of claim 1, further comprising:
   an auger supported relative to the crop tank, wherein the auger is provided in operative association with the frame such that the auger is movable between a first auger orientation associated with the covered position of the tank cover section and a second auger orientation associated with the open position of the tank cover section.

8. The system of claim 7, wherein the sensor array is pivotably coupled to the auger at the first pivot point.

9. The system of claim 1, wherein each of the plurality of crop level sensors is configured as at least one of a proximity sensor, optical sensor, RADAR sensor, LIDAR sensor, or ultrasonic transceiver.

10. The system of claim 1, further comprising:
    a controller configured to determine a current crop level of the harvested crop within the crop tank based on the data received from the plurality of crop level sensors.

11. The system of claim 1, wherein the sensor array comprises one of a plurality of sensor arrays, with each sensor array of the plurality of sensor arrays comprising a plurality of crop level sensors, wherein the plurality of crop level sensors of each sensor array is configured to capture data indicative of a crop level of the harvested crop at a different position within the crop tank.

12. The system of claim 1, wherein the sensor array is pivotably coupled to the tank cover section at the first pivot point, and wherein the sensor array is pivotably coupled to the frame of the crop tank at the second pivot point.

* * * * *